United States Patent

Griepentrog

[11] Patent Number: 5,488,417
[45] Date of Patent: Jan. 30, 1996

[54] AUTOMATIC KINESCOPE BIAS CONTROL SYSTEM

[75] Inventor: Dal F. Griepentrog, Indianapolis, Ind.

[73] Assignee: Thomson Consumer Electronics, In., Indianapolis, Ind.

[21] Appl. No.: 246,067

[22] Filed: May 19, 1994

[51] Int. Cl.$^6$ .................................................. H04N 5/68
[52] U.S. Cl. ........................................ 348/379; 315/383
[58] Field of Search .................................. 348/379, 380, 348/377, 378, 173, 805, 682, 691, 695, 696, 967, 634, 637; 315/94, 105, 106, 381, 386, 384, 385, 383; 328/168, 172, 173, 175; H04N 5/68

[56] References Cited

U.S. PATENT DOCUMENTS

| 4,263,622 | 4/1981 | Hinn | 348/379 |
|---|---|---|---|
| 4,484,228 | 11/1984 | Parker | 348/379 |
| 4,536,800 | 8/1985 | Parker | 348/379 |
| 4,633,321 | 12/1986 | Tallant, II | 358/243 |
| 4,694,350 | 9/1987 | Hinn | 358/242 |
| 5,036,257 | 7/1991 | Norman et al. | 348/173 |

Primary Examiner—James J. Groody
Assistant Examiner—Michael H. Lee
Attorney, Agent, or Firm—Joseph S. Tripoli; Peter M. Emanuel; Richard G. Coalter

[57] ABSTRACT

A controllable current source in an AKB circuit applies a measurement current to a kinescope driver amplifier during selected lines of the vertical interval of a video input signal to induce a beam current in a kinescope coupled to the driver amplifier. A comparison circuit compares samples of the beam current obtained during the selected lines with a reference signal and applies a correction current to the driver amplifier for regulating a parameter (e.g., black level) of images displayed by the kinescope. A signal source, coupled to the measurement current source, inhibits production of the measurement current during retrace portions of the selected lines and enables production of the measurement current during trace portions of the selected lines. Advantageously, the signal source provides suppression of visual artifacts due to AKB operation when using direct view or projection kinescopes of a type in which pincushion correction is not applied during line retrace intervals.

1 Claim, 2 Drawing Sheets

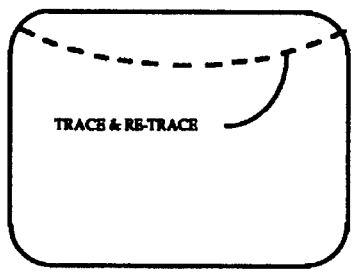
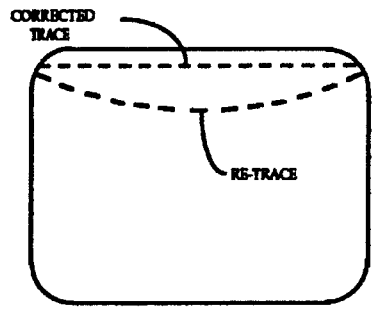
FIG. 2A
FIG. 2B
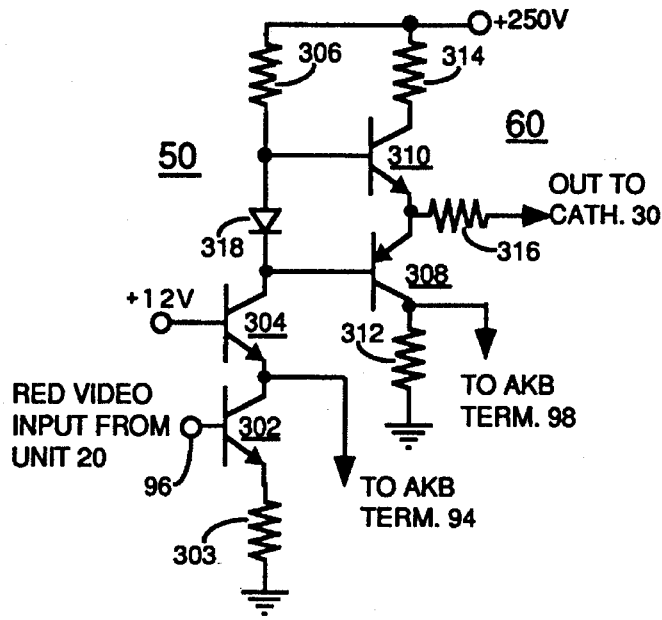
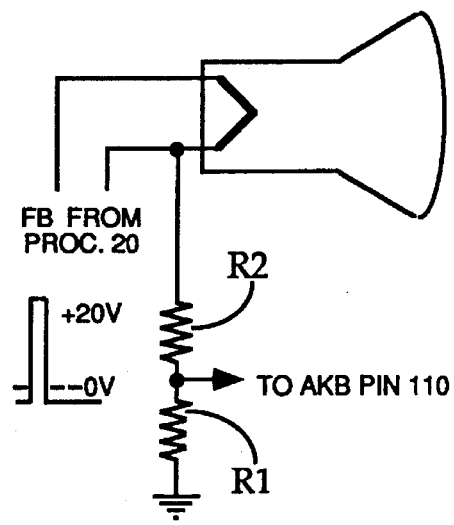
FIG. 3
FIG. 4

1

AUTOMATIC KINESCOPE BIAS CONTROL SYSTEM

FIELD OF THE INVENTION

This invention relates to television systems generally and particularly to television systems employing automatic kinescope bias control systems.

BACKGROUND OF THE INVENTION

Direct view and projection video display systems sometimes employ automatic kinescope bias (AKB) control systems for maintaining proper black image current levels for each electron gun of an associated image displaying kinescope. Advantageously, displayed picture colors and picture gray scale information are prevented from being adversely affected by variations of kinescope bias from a desired level due to such factors as aging and temperature changes. An example of such a system is described by Tallant in U.S. Pat. No. 4,633,321 entitled AUTOMATIC KINESCOPE BIAS CONTROL SYSTEM which issued Dec. 30, 1986.

A conventional AKB control system includes a beam current sampling element coupled to a control amplifier in an AKB feedback control loop for automatically adjusting the kinescope black level. Generally, this is done by sampling the kinescope drive level during a retract interval (e.g., vertical blanking), comparing the sample with a reference level and applying a correction current to the driver amplifier in a sense to adjust the black level to a desired value.

It is recognized in the above-mentioned Tallant patent that in certain television display systems the addition of an AKB control system may produce undesirable visible artifacts which require correction. One such situation is illustrated in FIGS. 2A and 2B herein which illustrate certain pincushion effects of a displayed raster. FIG. 2A illustrates the geometric distortion of a horizontal line displayed near the top of the television screen. Lines which pass through the center of the screen will be straight but, as shown, lines near the top (or bottom) of the screen will exhibit a curved or arcing shape commonly called the "pincushion" effect. In direct view kinescopes this distortion may be reduced or eliminated by proper yoke design or by means of special pincushion correction signals applied to the yoke. In certain types of kinescopes, however, pincushion correction is applied only during the trace portion of a line and not during the retract portions. An example, discussed by Tallant, is the "planar" kinescope. Certain projection systems also apply pincushion correction to just the active video trace interval and not during the beam retract interval. An effect of not correcting the trace position during the retrace interval is illustrated in FIG. 2B. As seen, the raster line is straight during the trace interval but exhibits a downwardly projecting arc during retrace. Since the beam is normally blanked during retrace, the lack of correction during the retrace interval is not visible for the active lines of the video signal.

A problem arises when AKB control is added to a display system of the type which provides no pincushion correction during retrace intervals. Recall that the AKB measurement current is applied to the kinescope during the vertical interval. Normally, the lines of the vertical interval are off the visible screen. Even though the video is blanked during this period, the injected AKB measurement current will cause beam current conduction during the vertical interval. The corrected lines during the trace interval are not visible since they are all above the top of the visible raster. However, the un-corrected horizontal retrace lines near the end of the vertical interval can arc or "hang" down into the visible portion of the display area.

Stated another way, the un-corrected retrace pattern may be seen in a receiver employing an AKB system of the type which requires kinescope beam current conduction during several line intervals for measurement and adjustment of the beam current. The measurement current is normally applied shortly after the end of the vertical retrace interval during the picture "overscan" portion of the display at the very top of the display screen and so the relatively straight pincushion corrected lines during trace intervals are not seen by the viewer. However the uncorrected retrace pattern exhibits a pronounced downward arcing trajectory at the top of the display screen and some of them may extend into the portion of the display seen by the viewer. The result is that the AKB measurement current can produce an objectionable visible artifact during the unblanked AKB operating interval which may be manifested in the form of several horizontal retrace lines in whole or in part.

In an embodiment of the Tallant apparatus, the problem of objectionable visible artifacts is eliminated by providing a grid drive signal in the form of a composite signal, with positive white-drive pulse components present only during the horizontal trace intervals encompassed by the grid drive signal, and with the grid drive signal being blanked during horizontal retrace intervals. Accordingly, the grid drive signal will induce white-going cathode output current only during the (corrected) trace intervals (FIG. 2B) which are within the kinescope display overscan region and not seen by a viewer.

SUMMARY OF THE INVENTION

It is herein recognized, however, that a need exists for a simplification of the manner of providing blanking during the retrace intervals which does not require special grid drive circuitry. The present invention is directed to meeting that need. Advantageously, in kinescope display systems embodying the present invention, costs may be reduced and the overall reliability may be improved.

In accordance with the invention, a controllable current source in an AKB circuit applies a measurement current to a kinescope driver amplifier during selected lines of the vertical interval of a video input signal to induce a beam current in a kinescope coupled to the driver amplifier. A comparison circuit compares samples of the beam current obtained during the selected lines with a reference signal and applies a correction current to the driver amplifier for regulating a parameter (e.g., black level) of images displayed by the kinescope. A signal source, coupled to the controllable current source, inhibits production of the measurement current during retrace portions of the selected lines and enables production of the measurement current during trace portions of the selected lines.

Advantageously, the signal source provides suppression of visual artifacts due to AKB operation when using direct view or projection kinescopes of a type having no pincushion correction during retrace intervals.

BRIEF DESCRIPTION OF THE DRAWING

The foregoing and further features of the invention are illustrated in the accompanying drawing, wherein like elements are denoted by like reference designators, and in which:

FIGS. 2A and 2B are pictorial diagrams illustrating certain types of geometric distortion (pincushion effects) characteristic of direct view and production kinescopes:

FIG. 3 is a schematic diagram of portions of the apparatus of FIG. 1; and

FIG. 4 is a detailed schematic diagram illustrating a preferred source of retrace blanking signal for use in the apparatus of FIG. 1.

DETAILED DESCRIPTION

Figure 1:
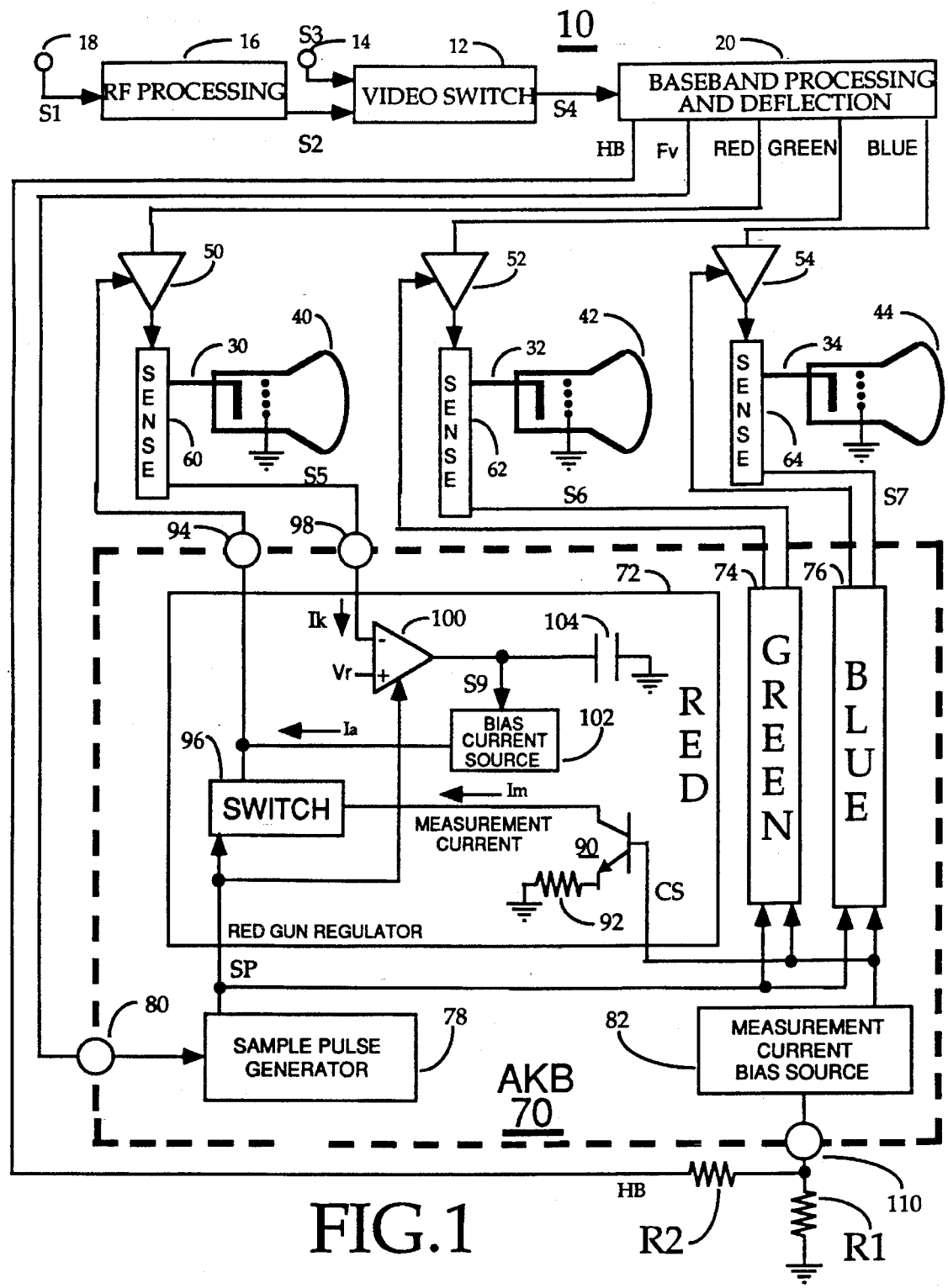
FIG. 1 is a block diagram, partially in schematic form, of television apparatus embodying the invention.

The projection television receiver 10 of FIG. 1 includes a switch 12 for selecting a baseband video signal S1 provided by an auxiliary input terminal 14 or a baseband video signal S2 provided by an RF processing unit 16 having antenna input terminal 18 for connection to a suitable RF video source such as an antenna, cable or VCR. Unit 16 may be of conventional design including, for example, a tuner, IF amplifier and video detector for converting the RF input signal S3 applied to terminal 18 to baseband form. The selected video signal S4 (i.e., signals S1 or S2) selected by switch 12 is applied to a baseband video processing and deflection unit 20 which produces component video signal R (red), G (green) and B (blue) and a vertical timing signal Fv (e.g., vertical retrace). Unit 20 is of conventional design and includes, illustratively, color demodulation circuitry, control circuitry for hue, tint, brightness and contrast as well as a matrix for generating the RGB component signals and synchronizing and deflection circuitry which provides the vertical retrace signal Fv.

The RGB color signals are applied to respective cathodes 30, 32 and 34 of red, green and blue projection kinescopes 40, 42 and 44 by means of respective kinescope driver amplifiers 50, 52 and 54. The control grids of the kinescopes are coupled to a common reference potential (ground).

Advantageously, as will be explained, the problem of "hanging AKB retrace lines" is solved in the present invention without requiring any modulation of the kinescope control grid voltage thereby eliminating the need for relatively high voltage grid driver transistors and associated timing and voltage translating circuitry. The economic benefit is readily apparent. Additionally, there is a technical benefit in that the reduction of components leads to an improvement in the overall circuit reliability as compared with systems employing control grid modulation.

A beam current sensing circuit 60 is coupled between the output of driver amplifier 50 and cathode 30 of kinescope 40 for sensing the kinescope beam current. Beam current sensing circuits 62 and 64 are similarly disposed between driver amplifiers 52 and 54 and respective ones of cathodes 32 and 34 of kinescopes 42 and 44. The beam current sensors 60, 62 and 64 provide respective beam current representative signals S5, S6 and S7 to respective inputs of a red beam current regulator 72, a green beam current regulator 74 and a blue beam current regulator 76 in an AKB circuit 70 (outlined in phantom). In the interest of improved cost and reliability, it is preferred that the AKB circuit 70 be of an integrated circuit type rather than the discrete component type. Other regulators, either discrete or integrated, may be used provided the regulator circuitry topology is such as to enable amplitude modulation of the regulator measurement current source which induces beam current conduction during the AKB regulation cycle.

AKB circuit 70 includes the three beam current regulators 72, 74 and 76 noted above and also includes a sample pulse generator 78 and a measurement current bias source 82 which commonly control the operation of the three individual regulators. Sample pulse generator 78 is coupled at the input terminal 80 thereof to receive the vertical timing signal Fv which identifies the vertical blanking interval and generates AKB sample pulses SP which are supplied to each of the regulators 72, 74 and 76. The sample pulses, which control the timing of the AKB cycle, follow the vertical synchronizing pulses in the vertical blanking interval of the video signal S4 and last for several lines (e.g., at least two lines). The measurement current bias source 82 generates a control signal CS which controls the amplitude of measurements currents produced in the regulators which induces beam current conduction in the kinescopes 40, 42 and 44 during the AKB regulation cycle.

The red, blue and green regulators 72, 74 and 76 are identical and so only the details of one, the red regulator 72, are shown. In regulator 72 the control signal CS produced by measurement current bias source 82 is applied to the base of an NPN transistor 90 having an emitter coupled to a point of reference potential (ground) via an emitter resistor 92 and having a collector coupled to an output terminal 94 by a switch 96. Transistor 90 functions as a current source producing the measurement current Im in proportion to the control signal CS. Switch 96 is controlled by the sample pulse SP produced by generator 78 and couples the current Im to output 94 during a few lines of the vertical interval after occurrence of the vertical synchronizing (retrace) pulse Fv. Terminal 94 is coupled to an AKB bias input of kinescope driver amplifier 50 which causes amplifier 50 to produce a gray level drive signal to kinescope 40 during the AKB regulation cycle.

The actual beam current produced by kinescope 40 depends on factors such as temperature, age and the effective cathode impedance which is a non-linear function of the cathode drive voltage. Sensing circuit measures the actual beam current conducted by kinescope 40 and applies the beam current signal S5 to the inverting input of keyed comparator amplifier 100 in regulator 72 via input terminal 98. Amplifier 100, keyed or enabled by the sample pulses SP, compares signal S5, which represents the actual beam current,) with a reference signal Vr for controlling a current source 102 that is coupled to supply a feedback adjustment or "correction" current to kinescope driver amplifier 50 for regulating the black level of displayed images. Current adjustments are made during the vertical blanking interval of the video signal S4 in synchronism with the sample pulses SP provided by the sample pulse generator 78. Specifically, in response to the retrace signal pulse Fv applied to terminal 80, the sample pulse generator 78 generates a sample pulse SP at the end of the vertical retrace period which closes switch 96 thereby applying a sample measurement or "reference" current produced by transistor 90 to the driver amplifier 50 which is used to determine the actual beam current.

Amplifier 100, keyed by the sample pulse SP, determines if the kinescope cathode current Ik is above or below the value corresponding to the reference voltage Vr and supplies a control signal S9 to the bias current source 102 in a sense to adjust the kinescope black level to the desired level represented by Vr. The control signal S9 is smoothed by means of an integration capacitor 104 which is external to the integrated circuit 70. As more samples are accumulated during an AKB cycle an equilibrium or "steady state" condition will be reached in which the correction current Ia supplied to driver amplifier 50 will be just sufficient to maintain the black level drive for kinescope 40 at a level determined by the reference voltage Vr applied to the amplifier 100. The feedback in the red kinescope driver control loop is negative and so counteracts any tendency for an undesired change in the black level which may be due, for example to component aging or to temperature variations.

The measurement current control signal CS for all three kinescope regulators 72, 74 and 76 is provided by the common measurement current bias source 82 which is programmable by means of a control terminal 110 which is coupled to ground reference potential via a resistor R1 and to a source of horizontal line rate signal HB or flyback pulses FB by resistor R2. Within source 82 terminal 110 is coupled to the emitter of a transistor current source which provides measurement current bias which varies inversely with the resistance between terminal 110 and ground. The greater the resistance, the lower the measurement current bias and vice versa.

A preferred source of horizontal line rate signals for blanking the retrace portion of the measurement current is shown in FIG. 4 and discussed in detail later. Briefly, the preferred source comprises the "heater" or filament supply for the kinescopes which is obtained from flyback pulses in the deflection portion of unit 20. Advantageously, this source is quite robust and requires no buffering or other means to prevent adverse loading of small signal detectors (e.g., blanking generators, sandcastle circuits, etc.). The line rate pulses are high (e.g., 20 volts or so) during the line retrace intervals and low (slightly negative) during the line trace intervals. When using the heater voltage as a source of line rate (blanking) signals, resistor R2 should be substantially larger than resistor R1. (Exemplary values are 18 k-Ohms for R1 and 100 k-Ohms for R2.) When signal HB is low, resistors R1 and R2 both conduct current from terminal 110 to ground thus setting the amplitude of the measurement current Im. However, when signal HB is high (illustratively, 20 volts or so) resistor R2 supplies current to terminal 20 that counteracts the current withdrawn from terminal 20 by resistor R1. Accordingly, during the trace intervals (HB low) both resistors aid in generating the measurement current Im and during the re-trace intervals (HB high) the resistor current cancel and the measurement current Im is forced to zero. As a result, the measurement current Im is blanked during re-trace intervals of the AKB measurement cycle and the forgoing problem of "hanging" retrace lines extending from the vertical interval into the active picture interval is eliminated.

To summarize the foregoing, briefly, when in operation the driver amplifier (50) applies the video signal (red) to the cathode (30) of kinescope (40) for producing images. The beam current sensor (60), coupled to the kinescope (40) provides samples (S5) of the kinescope beam current (Ik) to the AKB circuit (70). The AKB circuit includes a measurement current source (82, 90, 92, 96) coupled to the driver amplifier (50) for applying a measurement current (Im) thereto during selected lines of the vertical interval of the video signal (S4). A comparing circuit (100, 102, 104) compares the beam current samples (S5) for producing and applying a correction or adjustment current (Ia) to the kinescope driver amplifier (50) to regulate a particular parameter (black level) of the images displayed by the kinescope (40). Circuitry is provided (a source of HB signals and resistor R2) and coupled to the control input (110) of the measurement current source (82, 90, 92, 96) for inhibiting production of the measurement current (Im) during re-trace portions of the selected lines and for enabling production of the measurement current (Im) during trace portions of the selected lines.

FIG. 3 illustrates circuit details of a kinescope driver amplifier and beam current sensor suitable for use as amplifier 50 and sensor 60 and in which, advantageously, the sensor provides dual functions of acting as a buffer amplifier for the amplified video signal and as a beam current sensor. Amplifier 50 includes an input transistor 302 coupled in cascode with an output transistor 304. The gain of the amplifier is determined by the ratio of a collector load resistor 306 of the common base connected output transistor 304 and an emitter load resistor 303 in the emitter circuit of input transistor 302. The relatively high output impedance of the amplifier is reduced by means of a complementary emitter follower buffer amplifier comprising transistors 308 and 310 having emitter electrodes coupled via protection resistor 316 to cathode 30 of kinescope 40 and having respective surge current limiting resistors 312 and 314 in their collector circuits. These resistors are sometimes referred to as being for "suicide prevention" as they limit the maximum transistor rail to rail current flow during simultaneous conduction of the transistors 308 and 310 which can occur briefly under large signal transient conditions. Diode 318 provides an offset between the base electrodes of transistors 308 and 310 for reducing the amplifier cross-over distortion. The collector of transistor 308 provides an output for beam current flow to the AKB current sensor input terminal 98. The measurement current input from terminal 94 of the AKB circuit is applied to the emitter of the common base connected output transistor 304.

To briefly summarize the operation of amplifier 50 and sensor 60, the transistor 302 amplifies the red video input signal with a gain determined by the ratio or resistors 306 and 303. Transistor 304 suppresses the Miller effect by regulating the collector voltage of transistor 302 at a constant value (12 volts less Vbe 304). Diode 318 partially offsets the output drive signals to the buffer amplifier 60 to reduce cross over distortion. Amplifier 60 provides unity gain and an impedance reduction as well as sensing the beam current Ik. Resistors 314 and 312 limit maximum rail to rail current flow through transistors 308 and 310 during large video transients. The collector current of transistor 308 represents the kinescope beam current and a portion of it is sent to terminal 98 as the AKB sensing current with the measurement current being applied to the emitter of transistor 304.

In FIG. 4 the source of retrace blanking signal for modulation of the AKB measurement current Im injected into amplifier 50 is provided by resistor R2 coupled between AKB pin 110. Resistor R1, in combination with R2 applies measurement current bias to pin 110 when the filament (heater) voltage is low (e.g., below ground, as shown in the inset waveform). When the flyback pulse is high, the current through R2 supplies all the current conducted by resistor R1 and so none flows into pin 110 and the beam measurement current is disabled (reduced to zero) thereby blanking the hanging AKB measurement retrace lines in the vertical interval.

Other sources of suitable blanking pulses may be used instead. For example, the baseband video signal provided by switch 12 may be applied to a separate detector for detecting the horizontal blanking or an existing detector in unit 20 may be used for this purpose. An advantage of using the heater voltage (flyback pulse) for this purpose is that this pulse is quite robust and so one does not need a buffer amplifier to prevent loading of other circuitry. In other words, the current available from sync signal detectors, sandcastle generators and the like which could be used as a source of the blanking circuit may be limited and may require buffering to operate the AKB blanking whereas the filament (heater) supply is a high powered signal which requires no buffering or isolation circuits to drive the AKB blanking input.

What is claimed is:

1. Color television display apparatus, comprising:

first, second and third video driver amplifiers coupled to apply respective ones of first second and third component video signals to respective ones of first second and third kinescope cathodes;

first, second and third current sensors coupled to respective ones of said cathodes for providing respective first second and third cathode current indicating signals;

an AKB system including first, second and third AKB regulators, each having an input for receiving a respective cathode current indicating signal and an output coupled to supply a respective black level control current to a respective one of said kinescope drivers, each said black level control current including a black level bias component, Ia, and a black level measurement current component, Im; and means responsive to an analog voltage provided by a heater of one of said cathodes for controlling the magnitudes of said black level measurement currents during horizontal trace intervals and for suppressing said black level measurement currents during horizontal retrace intervals.

* * * * *